Patented Feb. 19, 1924.

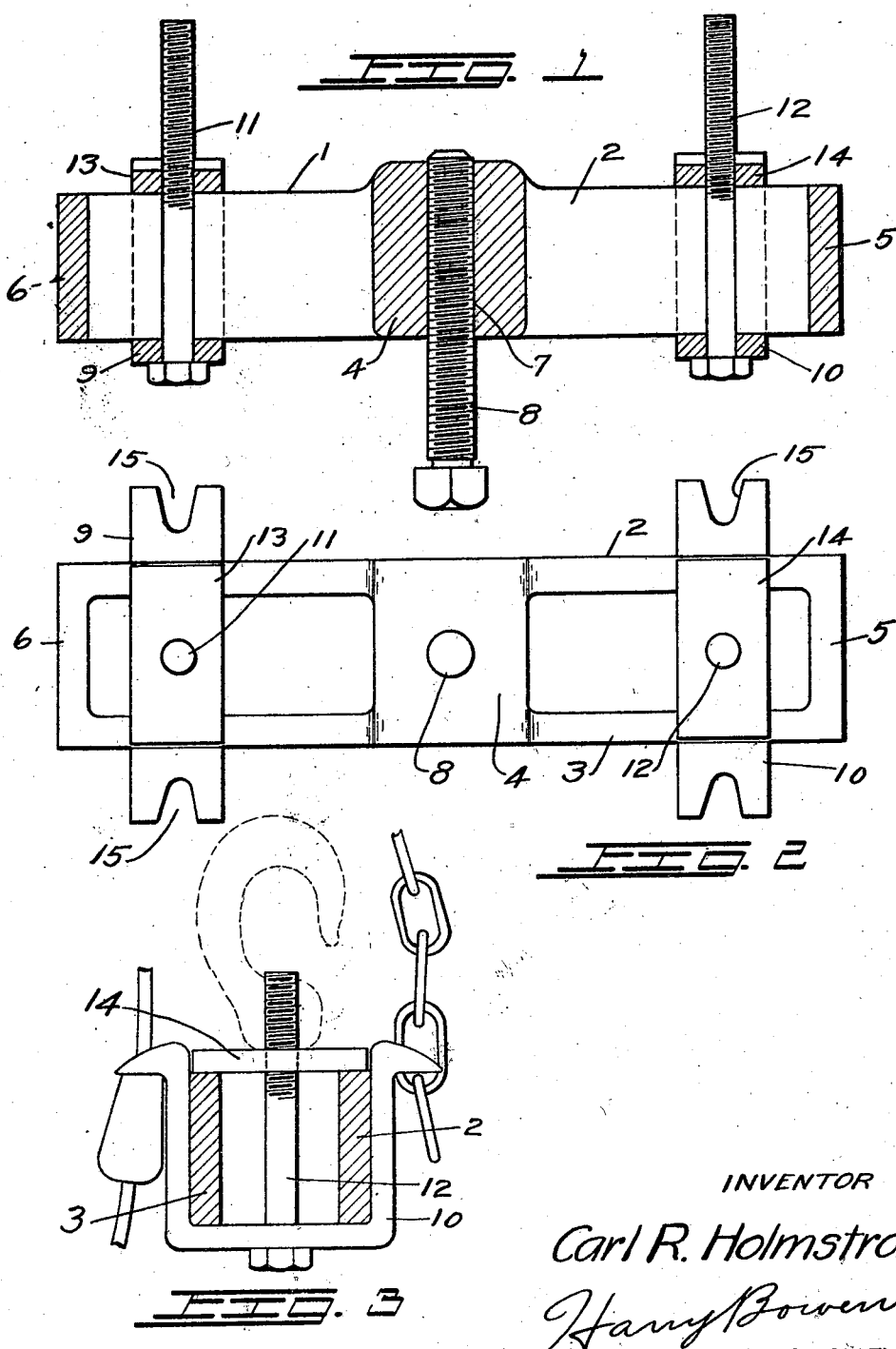

1,484,130

UNITED STATES PATENT OFFICE.

CARL R. HOLMSTROM, OF SEATTLE, WASHINGTON.

WHEEL PULLER.

Application filed November 23, 1922. Serial No. 602,749.

*To all whom it may concern:*

Be it known that I, CARL R. HOLMSTROM, a citizen of the United States, residing at Seattle, county of King, and State of Washington, have invented a new and useful Wheel Puller; and I do hereby declare that the following is a full, clear, and exact specification, such as will enable others skilled in the art to which it appertains to make and use the same.

The invention is a device for pulling motor vehicle wheels from the axles that may readily be attached to any type of wheel.

The object of the invention is to provide a device that may be attached to any type of motor vehicle wheel or to a gear which will have a screw in it that will bear against the end of the axle so that as the screw is screwed inward it will exert a tremendous pressure on the wheel and therefore pull it off of the axle.

A further object of the invention is to provide a device for pulling motor vehicle wheels that may be attached to wheels having either an even or odd number of spokes in them.

And a still further object of the invention is to provide a device for pulling motor vehicle wheels which is so constructed that it may be attached to the wheel by either a chain, cable or hook.

With these ends in view the invention embodies a frame constructed of two parallel bars tied together in the center and at each end. A bolt is placed in a threaded hole through the tie in the center and two U shaped clamps with forked outwardly projecting ends are slidably mounted on the frame and held to it by bolts passing through them and passing through plates on the frame. Chains, cables or hooks may be used to attach the device to motor vehicle wheels through the ends of the U shaped clamps or the bolts through them.

Other features and advantages of the invention will appear from the following description taken in connection with the drawings, wherein:—

Figure 1 is a longitudinal section through the device.

Figure 2 is a plan view.

Figure 3 is a cross section through the parallel bars showing the U clamp.

In the drawings I have shown my device as it would be constructed wherein numeral 1 indicates the frame that is constructed with two parallel bars 2 and 3 and these are tied together by a lug 4 in the center and bars 5 and 6 at the ends. In the lug 4 is a threaded hole 7 into which a bolt 8 is screwed and it will be seen that as this bolt is turned in a clockwise direction the tip will move out of the frame and exert a tremendous pressure on any thing with which it comes in contact. Around the bars are U shaped clamps 9 and 10 which fit snugly over the bars 2 and 3 and are held to them by bolts 11 and 12 which screw into plates 13 and 14. The ends of the clamps extend outwardly and have slots 15 in them through which a chain may be placed and held, which chain will first pass around the spokes of a wheel. Or it will also be seen that a cable or rope may be held in these slots and gripping nuts may be placed on the cable so that it will be automatically gripped as it is pulled through, as illustrated in Figure 3. And it will also be seen that a hook as illustrated in dotted lines in Figure 3 may be screwed on the ends of bolts 12 so that the device may be hooked directly to the wheel or attached to it in any desired manner.

It will be understood that changes may be made in the construction without departing from the spirit of the invention. One of which changes may be in the shape of the bars or in the placing of openings through them to lighten their weight. Another may be in the shape of the openings 15 in the U shaped clamps and another may be in the use of a different type of clamp or device for attaching the device to the wheels.

The construction will be readily understood from the foregoing description. To use the device it may be placed against the side of a wheel and secured to the wheel by placing chains around any desired number of the spokes and then hooking them to the U-shaped clamps through the openings 15. It will be seen that a cable may be used instead of the chain and this may be held to the ends of the clamps by tying it to them or by using a gripping nut and drawing the cable through it. Should it be impossible to pass a chain or cable through the wheel as in the case of a gear a hook may be placed on the bolt in the clamp and this may be attached to the wheel in any desired manner. After the device is secured to the wheel in such a position that the bolt in the center will bear against the end of the axle the bolt may be screwed inward and the more it is turned the more force it will exert against the end of the axle and as this force increases the wheel will be pulled off of the axle. It will be seen that if the threads on the bolt 8 are made with a very small pitch it will be possible to exert an enormous pull on the wheel.

Having thus fully described the invention what I claim as new and desire to secure by Letters Patent, is:—

1. A wheel puller comprising a frame constructed of two parallel bars that are connected together by a lug in the center and by bars at each end, the lug having a threaded hole in the center thereof; a bolt in the threaded hole; U shaped clamps having outwardly projecting ends with slots in them slidably mounted around the bars; plates across the sides of the bars at the open ends of the clamps, bolts passing through the clamps between the bars and threaded through the plates; and suitable means for attaching the device to a wheel, or gear.

2. A wheel puller having bars forming sides, a section tying the two bars together in the center, other sections tying the ends together, a bolt screwed in the center section, bands extending partially around the sides having their ends slotted and bent outward, plates across the sides at the open ends of the band, and bolts passing through the bands and plates.

CARL R. HOLMSTROM.